P. PLANT.
Lamp Burner.
No. 19,896.
Patented April 6, 1858.
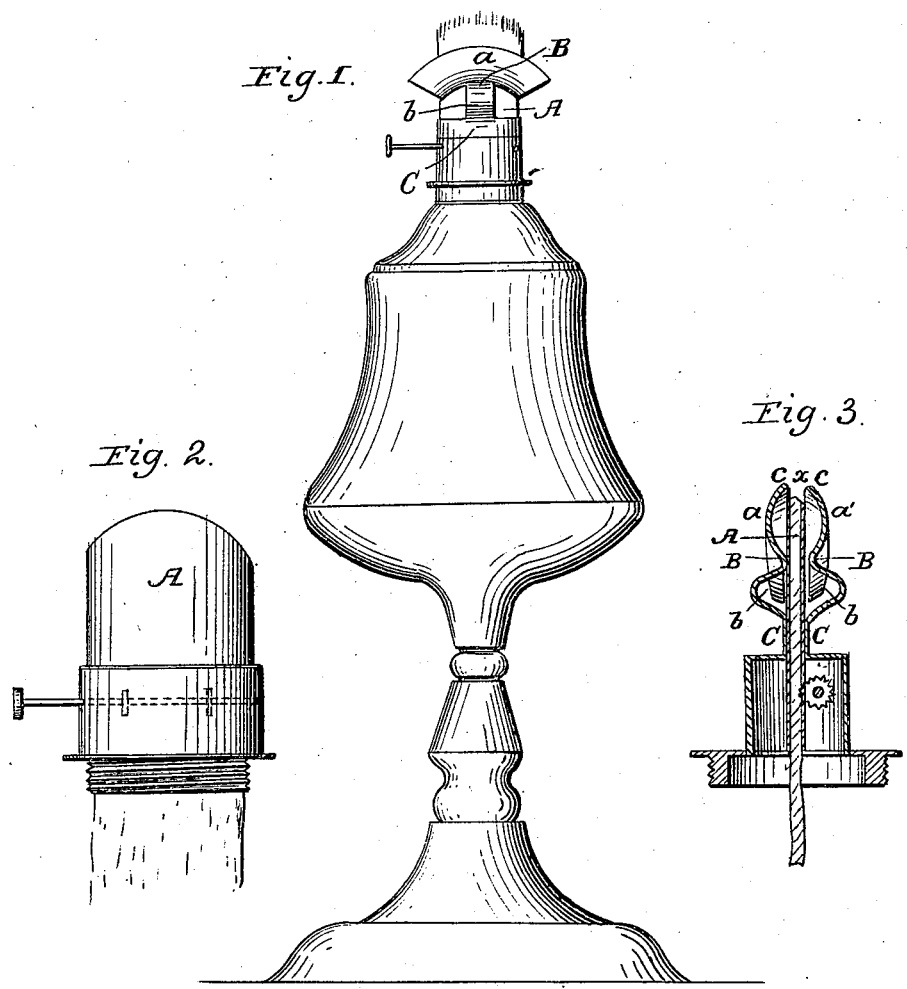

UNITED STATES PATENT OFFICE.

P. PLANT, OF WASHINGTON, DISTRICT OF COLUMBIA, ASSIGNOR TO HIMSELF AND P. HANNAY, OF SAME PLACE.

LAMP.

Specification forming part of Letters Patent No. 19,896, dated April 6, 1858; Reissued June 9, 1868, Nos. 2,973 and 2,974.

*To all whom it may concern:*

Be it known that I, PASCAL PLANT, of the city of Washington, in the District of Columbia, have invented a new and useful Improvement in Lamps, of which the following is a full, clear, and exact description, reference being had to the accompanying drawing, making part of this specification, in which—

Figure 1 represents a view in perspective of a lamp having my improvement applied thereto. Fig. 2 represents a side elevation of the wick tube, the cap piece being removed; Fig. 3, a transverse section taken vertically through the wick tube and cap piece; Fig. 4, a view in perspective of the cap piece.

My invention relates principally to that class of lamps fed by volatile or other oils having a high equivalent of carbon. Heretofore great difficulty has been experienced in bringing these kinds of oils into general and successful use for illuminating purposes because of their containing an excess of carbon, which as it requires a much larger amount of oxygen for its combustion than can be supplied from the air immediately surrounding the plane, allows a great portion of the gas engendered to escape in an unconsumed condition in the shape of smoke or soot, to remedy which it has been found necessary to provide the lamps with a glass chimney for the purpose of creating an artificial draft, or in other words, of bringing a much larger amount or body of air in contact with the flame, so as to supply the necessary amount of air for the consumption of the free carbon. But such an arrangement as this, while it only effects the desired object to a certain degree, renders the lamps at once costly, and liable to get out of repair, and totally impracticable for carrying about. Again lamps provided with glass chimneys are less efficient when fed with volatile than with common oil, as in burning the latter the equivalent of hydrogen contained in it (which on account of its greater affinity for oxygen than carbon combines with it first, and in burning forms the outer and under part of the flame, that is to say the blue flame) evolves a high degree of heat which raises the temperature of the carbon held in suspension sufficiently high to enable it as it ascends over the hydrogen flame to combine with the oxygen, as it is supplied by the current of fresh air passing up along the outer sides of the flame, thereby giving to it the requisite properties to be entirely consumed. But in burning volatile oils, &c., where a higher equivalent of carbon is present, when the latter is raised sufficiently high to be brought in contact with the current of air, the degree of temperature of a large portion of it will be entirely too low to enable it effectually to combine with the oxygen and hence it will escape at the top of the flame unconsumed, in the form of smoke or soot, to diminish which it will be necessary to retard the dry distillation of the oil at the top of the wick by lowering the latter, thus diminishing the flame and consequently the light, for which reason a lamp fed with volatile oils, &c., never yields as much light as one of the same capacity and construction in which common oil is consumed.

The nature of my invention consists in forcing through the lower part of the flame a current of fresh air so that the oxygen therein contained shall be brought immediately in contact with the carbon the moment the degree of temperature of the latter is sufficiently high to promote combustion, to effect which I provide the lamp with a cap piece of peculiar construction and arrangement, by the use of which a lamp may be either fed with common or volatile oil, &c., and yet the entire carbon be consumed as it is evolved, and that without the aid of a glass chimney over the flame.

To enable others skilled in the art to make, construct and use my invention I will now proceed to describe it in detail, omitting a description of such parts of a lamp as are non-essential to the full understanding of my present improvement.

In the accompanying drawing the upper part of the wick tube (A) is represented as being inclosed by a cap piece (B) consisting of two sides ($a$ and $a'$) properly formed and shaped to suit the form of the upper end of the wick tube (A) and which in this instance is curved, they being so arranged in relation to each other as to form an arched dome as it were over the wick tube, open at top and bottom, in which position they are held by means of arms ($b$) riveted or otherwise secured to or formed on a slide (C) which fits over the wick tube. The lips (c) or upper ends of the sides (a and a') are curved or inclined toward each other, but not meeting, thus forming a slot (x) as it were, corresponding in form and length to the upper end of the wick tube (A), the bounding lines or lips (c) of the slot (x) being so arranged that when the cap piece is adjusted on the wick tube they shall be in a line or nearly so with the sides of the latter, so that when the lamp is lighted the under part of the flame or the blue flame shall burn in the slot (x) and spread to the edge of the lips (c) thus forcing or causing the air to pass through the flame instead of passing up along its sides, for as the air confined in the under side of the cap piece (B), and which for this purpose is curved or set at an angle to the top of the wick tube (A) so as to form an air chamber, is heated and rises, and there being only a small space at the top through which it can pass in that direction and that only through the flame (as it spreads from lip to lip), a sufficient current will be induced to supply the requisite amount of oxygen for the complete combustion of the carbon, and that when the latter is in the most favorable condition for this purpose—to wit, when highly heated.

The form and size of the slot (x) of the cap piece (B) and its elevation over the wick tube (A) will depend altogether upon the size and form of the upper end of the wick tube, whether straight, curved or circular, to all of which it can be readily adapted, its height being adjusted by causing it to slide up and down on the wick tube, and the lips themselves (which may be made corrugated if desired) may be made to approach or recede from each other as circumstances may require, either by means of an adjusting screw, or by compressing or opening the arms, or in any other suitable manner, and the sides (a and a') for the purpose of trimming the lamp may instead of being secured to the slide by arms (b) be hinged to the slide at one end, and thus be thrown back from the flame without removing the slide from the wick tube, and here it may be remarked that a glass chimney or globe could also be placed over the lamp if deemed advisable for the purpose of shielding the flame from side drafts.

From the foregoing description it will be readily perceived that the form of my cap piece and the manner of attaching or securing it to the lamp may be modified, so long as it is so constructed and arranged in relation to the wick tube that the under part or the blue flame shall burn in and fill the whole space of the slot.

Having thus described my invention what I claim as new and desire to secure by Letters Patent is—

Forcing a current of air through the lower or blue part of the flame by means of a cap piece constructed and arranged in relation to the wick tube in the manner and for the purposes substantially as set forth.

In testimony whereof, I hereunto set my hand to this specification.

PASCAL PLANT.

Witnesses:
 JOHN S. HOLLINGSHEAD,
 MASON PIGGOTT.

[FIRST PRINTED 1912.]